(12) United States Patent
Linzer

(10) Patent No.: US 6,724,977 B1
(45) Date of Patent: Apr. 20, 2004

(54) COMPRESSED VIDEO EDITOR WITH TRANSITION BUFFER MATCHER

(75) Inventor: Elliot N. Linzer, Bronx, NY (US)

(73) Assignee: LSI Logic Corporation, Milpitas, CA (US)

( * ) Notice: Subject to any disclaimer, the term of this patent is extended or adjusted under 35 U.S.C. 154(b) by 378 days.

(21) Appl. No.: 09/925,088

(22) Filed: Aug. 7, 2001

Related U.S. Application Data

(62) Division of application No. 08/987,495, filed on Dec. 9, 1997, now Pat. No. 6,301,428.

(51) Int. Cl.[7] .......................... H04N 5/76; H04N 5/917; H04N 7/26
(52) U.S. Cl. ...................... 386/52; 386/11; 375/240.04; 375/240.05
(58) Field of Search .................. 386/4, 33, 52–64, 386/111–112; 375/240.01, 240.02, 240.03, 240.04, 240.05, 240.06, 240.07, 240.12, 240.28; 382/251, 253; 345/723; H04N 5/76, 5/92, 5/917, 7/26, 7/12, 9/79

(56) References Cited

U.S. PATENT DOCUMENTS

| | | | | |
|---|---|---|---|---|
| 5,043,808 A | * | 8/1991 | Knauer et al. | 375/240.11 |
| 5,534,937 A | * | 7/1996 | Zhu et al. | 375/240.27 |
| 5,534,944 A | * | 7/1996 | Egawa et al. | 348/584 |
| 5,732,183 A | * | 3/1998 | Sugiyama | 386/4 |
| 5,859,660 A | * | 1/1999 | Perkins et al. | 725/32 |
| 5,870,146 A | * | 2/1999 | Zhu | 375/240.03 |
| 5,877,812 A | * | 3/1999 | Krause et al. | 375/240.25 |
| 6,141,358 A | * | 10/2000 | Hurst, Jr. et al. | 370/543 |
| 6,173,012 B1 | * | 1/2001 | Katta et al. | 375/240.15 |
| 6,229,849 B1 | * | 5/2001 | Mihara | 375/240.05 |
| 6,301,428 B1 | * | 10/2001 | Linzer | 386/52 |
| 6,418,122 B1 | * | 7/2002 | Schoenblum et al. | 370/252 |
| 6,480,539 B1 | * | 11/2002 | Ramaswamy | 375/240.03 |
| 6,597,858 B1 | * | 7/2003 | Linzer | 386/52 |
| 2002/0154694 A1 | * | 10/2002 | Birch | 375/240.05 |

* cited by examiner

Primary Examiner—Thai Tran
(74) Attorney, Agent, or Firm—Thelen, Reid & Priest, LLP

(57) ABSTRACT

A method and system for determining and recording a minimal ending video buffer verifier fullness at each of a plurality of entry points in a compressed variable bit rate video bit stream.

3 Claims, 6 Drawing Sheets

COMPRESSED VIDEO EDITOR WITH TRANSITION BUFFER MATCHER

CROSS-REFERENCE TO RELATED APPLICATION

This application is a divisional of U.S. patent application Ser. No. 08/987,495, now U.S. Pat. No. 6,301,428 B1, entitled "COMPRESSED VIDEO EDITOR WITH TRANSITION BUFFER MATCHER" by Elliot N. Linzer, filed on Dec. 9, 1997.

FIELD OF THE INVENTION

The present invention relates to a method and system for editing video bit streams. In particular, the present invention relates to a method and system for encoding transitions between encoded video segments so that the ending buffer fullness of one segment is sufficiently large so that there will not be a buffer underflow while the following segment is decoded.

BACKGROUND OF THE INVENTION

Encoder

A video encoder system 10 is illustrated in FIG. 1. The system 10 includes a source of video 12, a preprocessor 14, a video encoder 16, a rate buffer 18 and a controller 20. The source 12 of video is, for example, a video camera, or a telecine machine which converts a sequence of film images into a sequence of video frames, or other device which outputs a sequence of video frames. The frames may be interlaced or progressive. An interlaced frame picture comprises top and bottom field pictures. The preprocessor 14 performs a variety of functions to place the sequence of video frames into a format in which the frames can be compressed by the encoder. For example, in the case where the video source is a telecine machine which outputs 30 frames per second, the preprocessor converts the video signal into 24 frames per second for compression in the encoder 16 by detecting and eliminating duplicate fields produced by the telecine machine. In addition, the preprocessor may spatially scale each picture of the source video so that is has a format which meets the parameter ranges specified by the encoder 16.

The video encoder 16 is preferably an encoder which utilizes a video compression algorithm to provide an MPEG-2 compatible bit stream. The MPEG-2 bit stream has six layers of syntax. There are a sequence layer (random access unit, context), Group of Pictures layer (random access unit, video coding), picture layer (primary coding layer), slice layer (resychronization unit), macroblock (motion compensation unit), and block layer (DCT unit). A group of pictures (GOP) is a set of frames which starts with an I-picture and includes a certain number of P and B pictures. The number of pictures in a GOP may be fixed.

The encoder distinguishes between three kinds of pictures, I, P, and B. The coding of I pictures results in the most bits. In an I-picture, each macroblock is coded as follows. Each 8×8 block of pixels in a macroblock undergoes a DCT transform to form an 8×8 array of transform coefficients. The transform coefficients are then quantized with a variable quantizer matrix. The resulting quantized DCT coefficients are scanned using, e.g., zig-zag scanning, to form a sequence of DCT coefficients. The DCT coefficients are then organized into run, level pairs. The run, level pairs are then entropy encoded. In an I-picture, each macroblock is encoded according to this technique.

In a P-picture, a decision is made to code the macroblock as an I macroblock, which is then encoded according to the technique described above, or to code the macroblock as a P macroblock. For each P macroblock, a prediction of the macroblock in a previous video picture is obtained. The prediction is identified by a motion vector which indicates the translation between the macroblock to be coded in the current picture and its prediction in a previous picture. (A variety of block matching algorithms can be used to find the particular macroblock in the previous picture which is the best match with the macroblock to be coded in the current picture. This "best match" macroblock becomes the prediction for the current macroblock.) The predictive error between the predictive macroblock and the current macroblock is then coded using the DCT, quantization, scanning, run, level pair encoding, and entropy encoding.

In the coding of a B-picture, a decision has to be made as to the coding of each macroblock. The choices are (a) intracoding (as in an I macroblock), (b) unidirectional backward predictive coding using a subsequent picture to obtain a motion compensated prediction, (c) unidirectional forward predictive coding using a previous picture to obtain a motion compensated prediction, and (d) bidirectional predictive coding wherein a motion compensated prediction is obtained by interpolating a backward motion compensated prediction and a forward motion compensated prediction. In the cases of forward, backward, and bidirectional motion compensated prediction, the predictive error is encoded using DCT, quantization, zig-zag scanning, run, level pair encoding, and entropy encoding.

B pictures have the smallest number of bits when encoded, then P pictures, with I pictures having the most bits when encoded. Thus, the greatest degree of compression is achieved for B pictures. For each of the I, B, and P pictures, the number of bits resulting from the encoding process can be controlled by controlling the quantizer step size. A macroblock of pixels or pixel errors which is coded using a large quantizer step size results in fewer bits than if a smaller quantizer step size is used. Other techniques may also be used to control the number of encoded bits.

After encoding by the video encoder, the bit stream is stored in the encoder buffer 18. Then, the encoded bits are transmitted via a channel 21 to a decoder, where the encoded bits are received in a buffer of the decoder or stored in a recording medium for later transmission to a decoder.

A decoder system 30 is shown in FIG. 2. An encoded video bit stream arrives via the transmission channel 21 and is stored in the decoder buffer 32. The size of the decoder buffer 32 is specified in the MPEG-2 specification. The encoded video is decoded by the video decoder 34 which is preferably an MPEG-2 compliant decoder. The decoded video sequence is then displayed using the display 36.

The purpose of rate control is to maximize the perceived quality of the encoded video sequence when it is decoded at a decoder by intelligently allocating the number of bits used to encode each picture. The sequence of bit allocations to successive pictures preferably ensures that an assigned channel bit rate is maintained and that decoder buffer exceptions (overflow or underflow) are avoided. The allocation process takes into account the picture type (I, P or B) and scene dependent coding complexity. To accomplish rate control at the encoder, the controller 20 maintains a model of the decoder buffer. This model is known as the video buffer verifier (vbv). The vbv is described in detail in Annex C of the MPEG-2 video standard the contents of which are incorporated herein by reference. (MPEG-2 Video Specification, Annex C). Bits are entered into the vbv in a manner which models the transmission channel. Bits are removed from the vbv in a manner which models removal of the bits by the decoder. That is, all the bits belonging to a picture are removed instantaneously. Based on the occupancy or fullness of the vbv, the controller 20 executes a rate control algorithm and feeds back control signals to the encoder 16 (and possibly to the preprocessor 14, as well) to control the number of bits generated by the encoder for succeeding pictures, and for succeeding macroblocks within each picture.

The rate control algorithm executed by the controller 20 controls the encoder 16 by controlling the overall number of bits allocated to each picture. The controller allocates bits to successive pictures to be encoded in the future so that the occupancy of the vbv is controlled thereby preventing exceptions at the decoder buffer 32. The predicted occupancy of the vbv buffer at any time depends on the number of bits which enter the vbv based on a model of the transmission channel and the number of bits removed from the vbv based on the predicted number of bits used to encode each picture.

One conventional rate control algorithm is the MPEG-2 Test Model (TM). The TM rate control is designed to expend a fixed average number of bits per group of pictures (GOP). If too many bits are spent on one GOP, then the excess will be remedied by allocating fewer bits to the next GOP.

From the perspective of vbv buffer occupancy (or fullness), the TM rate control attempts to force the vbv occupancy to the same level at the beginning of each GOP. The vbv buffer occupancy level is pulled to a predetermined level periodically at the beginning of a GOP. The controller receives an indication of vbv buffer occupancy and allocates bits to the succeeding frames such that the desired vbv buffer occupancy is predicted to occur at the end of the GOP. This often means that only a relatively small number of bits can be allocated to code frames which occur near the end of a GOP. To make the bit allocations, the controller 20 assumes that all frames of same type (I, P or B) lave the same number of bits.

The actual number of bits used by the encoder 16 to code a frame generally differs from the number of bits allocated by the controller 20. The deviation may be small or may be large, if, for example, there is a scene change and predictive coding cannot be used. The bit allocations provided by the controller for a set of frames are viewed by the encoder as targets which are updated frequently rather than hard and fast requirements. For example, an encoder may respond to an allocation by the controller by increasing or decreasing a quantization step size to increase or decrease the number of encoded bits for a frame. After each particular frame is actually encoded, the allocations for succeeding frames are updated by the controller, based on how many bits are actually used to encode the particular frame.

Video Editing System

A non-linear video editing system 40 is shown in FIG. 2A. Video is inputted through a Video Tape Recorder (VTR) 42 or other device to a video compressor 44, compressed, and stored to a device 46 which can be accessed in a non-linear fashion by a device such as a magnetic disk drive. The compressor 44 may be implemented by the Encoder of FIG. 1. Multiple video clips are stored in the non-linear storage device 46. The clips can be edited together into a video sequence which is decoded using the decompressor 45 and outputted to a VTR or other storage device. Alternatively, a compressed version of the edited video may be outputted for decompression and display on a separate system.

The editing of the video is typically performed by an operator using a computer 48 which receives decompressed video from the decompressor 45. Editing operations include adding effects to single clips (such as fade up from black, fade to black, blur, warp, etc.), adding effects to multiple clips (dissolve from one clip to another, wipe from one clip to another, picture-in-picture, etc.), cutting between clips, etc.

Most non-linear editors today use intra-frame only compression techniques, such as motion JPEG. However, because of the greater compression efficiency and interoperability of inter-frame compression standards such as MPEG, the industry is moving towards using inter-frame non-linear editors.

However, using inter-frame compression in a non-linear editor provides the system designer with many challenges. One is limited random-access; a compressed video stream can only be decompressed starting from a random access point (a sequence header followed by an I frame), and typically random access points are not placed at every frame. Also, a video clip can only begin at a so-called "closed GOP"; a random access point where all B frames immediately following the first I frame use backwards-only prediction or intra motion compensation. Moreover, if a bit stream is truncated before a B frame (in encode order), then the decoded bit stream will contain gaps in the display sequence of frames, so a bit stream can only be terminated before a reference frame (in encode order). (Note that the condition that a bit stream can only be terminated before a reference frame in encode order is equivalent to the condition that a bit stream can only be terminated after a reference frame in display order). Finally, when two video clips are spliced together, the resulting clip will in general cause decoder buffer exceptions.

The first two problems are mitigated by placing closed GOPs at regular intervals in a compressed bit stream. Because these are typically not placed at every frame, a non-linear editing system will typically re-encode several frames at each splice point. An example is shown in FIG. 2B, where a transition is created between two video streams. In this example, the end of the video stream "A" and the beginning of video stream "B" are decoded, and a transition (such as a dissolve) is performed on the decoded frames. The processed frames (the result of the dissolve) are then compressed, and a bit stream is formed by concatenating the compressed version of video A prior to the transition, the compressed version of the transition, and the compressed version of video B after the transition. As shown in FIG. 2B, the compressed transition area will in general include several frames from video A that are not truly part of the transition (because the compressed video stream A can only be truncated before a reference frame in encode order (after a reference frame in display order), and several frames from video B that are not truly part of the transition (because the compressed part of video B that is kept must start at a closed GOP).

Recompression is also required when an effect is added to part of a video sequence, as shown in FIG. 3. Again, extra frames are taken away from the pre-effect part of the sequence A0 and the post-effect part of the sequence A1 and added to the compressed effect clip due to the conditions on ending and starting a bit stream.

Even when bit streams are concatenated so that the last display frame in a first bit stream is a reference frame and the second bit stream begins with a closed GOP, and even if each individual bit stream would play back smoothly, the concatenated bit stream may not play back smoothly. The reason is that the decoder buffer, may underflow or overflow when playing back the concatenated bit stream.

To understand how a decoder buffer may underflow or overflow, consider an MPEG-2 bit stream. Annex C of the MPEG-2 video specification describes how a hypothetical decoder buffer (the "vbv" described above) behaves when decoding a bit stream, and requires that bit streams be constructed so that when this hypothetical decoder decodes them its buffer will neither underflow nor overflow. It is understood that actual decoders will behave slightly differently, but the constraints on the bit streams (that the hypothetical decoder neither underflow nor overflow) will be used to make sure that the buffers in real decoders neither overflow nor underflow.

The hypothetical decoder described by the MPEG-2 specification periodically removes compressed pictures from its buffer and decodes them. The first picture is removed a fixed amount of time after it begins to enter the decoder buffer. It the bit stream is a constant bit rate bit stream, bits enter at a constant rate. This situation is illustrated in FIG. 4 which is a plot of vbv fullness (i.e., vbv occupancy) as a function of time. The size of the hypothetical decoder buffer and the bit rate are all coded into the compressed bit stream. Also, the amount of time that the decoder waits from when it starts putting a picture into this buffer until it removes the picture from its buffer, called in MPEG-2 syntax the vbv_delay, is also coded into the bit stream for each picture. Note that for a constant bit rate stream, the number of bits in the decoder buffer before a picture is removed is proportional to the vbv_delay for that picture (the bit rate is the constant of proportionality). Many techniques are known to make sure that encoders produce bit streams that do not result in decoder buffer underflows or overflows; these techniques generally control the number of bits used by varying the quantization level between pictures and within pictures. Note that for a reasonably large decoder buffer, this model allows for wide variations in the number of bits in each frame, so I frames can use many more bits than P and B frames (as typically occurs), and unexpected variations in sequence content can be accommodated. For example, if the video suddenly gets more complex and the encoder uses more bits than planned on a particular picture (but not so many to cause a decoder buffer underflow), then the encoder slightly reduces the number of bits used in the next several pictures to make up for these "lost" bits.

The buffer fullness just before a picture is removed from the decoder can be calculated from its vbv_delay; it is equal to the vbv_delay times the bit rate. Thus, if two bit streams are to be spliced, the decoder buffer can be prevented from underflowing or overflowing if the decoder buffer fullness one picture time after the last picture of the first bit stream is removed from the decoder buffer equals the buffer fullness just before the first picture from the second bit stream is removed from the buffer (which can be determined from its vbv_delay). Thus, the encoder matches buffer fullness to make a seamless splice.

Conventional methods for controlling the bit rate of encoded material are rather imprecise, which when not splicing is fine. For example, if the encoder allocates a number of bits to a picture, and if it spends those bits at quantization step size, the picture might wind up using many more bits than allocated, but because of the large decoder buffer, these bits can be slowly made up (as mentioned). The quickness of the reaction can be increased, but this can lead to poor quality video (due to big variations in quantization step size).

When matching decoder buffer fullness, conventional rate control techniques will often lead to very poor quality video. Because the ending buffer fullness is set, reactions must be very fast (both between pictures and within pictures), so that too many bits will not be used (which would cause the resulting decoder buffer fullness to be too low). Using too few bits is not a problem, because zero stuffing can be used to "make" more bits. Accordingly, if even slightly more bits then planned are used on part of a picture, the encoder will start to rapidly increase quantization step size. If slightly fewer bits then planned are used on anther part, the quantization step size will be reduced, but the damage to picture quality will have been done. (The same situation occurs between pictures).

The MPEG-2 syntax allows for variable bit rate encoding at well, which is signaled by setting each vbv_delay to a particular value (i.e., 65535/90000 sec.) which is not used for constant bit rate. When variable bit rate is used, the decoder buffer fills up completely, and then each picture is removed periodically. If the decoder buffer is not full, bits enter the decoder buffer at the maximum bit rate (specified in the bit stream), but when the decoder buffer is full no bits enter. With this mode, the encoder does not have to worry about decoder buffer overflow, but it does have to worry about decoder buffer underflow. The decoder buffer behavior for variable bit rate is illustrated in FIG. 5.

When this MPEG-2 variable bit-rate syntax is used, if two bit streams are spliced together the resulting bit stream will not cause decoder buffer overflows. This is true because no bit streams can cause decoder buffer overflows. However, if the ending buffer fullness of the first stream is too low, the resulting spliced stream may cause a decoder buffer to underflow. Unlike the case for constant bit rate, there is no indication in the bit stream about what the decode buffer fullness will be in fact, i.e., there cannot be because the actual buffer fullness before a picture is removed depends on when encoding began. Consider a bit stream with three pictures; picture 1 is 500,000 bits, and pictures 2 and 3 are 200,000 bits, and assume a bit rate of 100,000 bits/sec and a decoder buffer size of 1,000,000 bits. If we start decoding from picture 1, the buffer fullness just before picture 3 is removed is 1,000,000−500,000+100,000−200,000+100,000=500,000. But if we start decoding from picture 2 it is 1,000,000−200,000+100,000=900,000. Therefore, splicing into a variable bit rate bit stream requires either ensuring that the ending buffer fullness of the stream before the splice is full (which can cause poor quality because few bits are used) or calculating, from the size of every picture remaining in the bit stream (after the splice), what ending buffer fullness will not cause underflows (which can be time consuming or impractical).

In view of the foregoing, it is an object of the invention to provide a method and system for editing video which overcomes the above described problems. In particular, it is an object of the invention to provide a method for processing a video bit stream so that its ending vbv fullness is above a threshold, which threshold is chosen sufficiently large so that when a subsequent video stream is concatenated to the original video bit stream, the subsequent video bit stream can be decoded without a vbv exception.

SUMMARY OF THE INVENTION

In accordance with a first embodiment of the invention, a method for editing video is provided. In accordance with the invention, a previously compressed first digital video bit stream is decoded to obtain a decoded digital video signal.

In response to statistical values which characterize the previously compressed first digital video bit stream, the decoded digital video signal is re-encoded to form a second digital video bit stream such that an ending fullness of a vbv does not fall below a predetermined threshold. Optionally, an effect may be added to the decoded digital video signal before re-encoding. The statistics are preferable gathered while encoding the previously compressed digital video bit stream or while decoding the previously compressed digital video bit stream.

A second embodiment of the invention is directed to a method for splicing a first compressed digital video bit stream and a second compressed digital video bit stream. The first compressed digital video bit stream has a plurality of entry points. Each of the entry points, has an associated threshold buffer fullness, such that if an actual vbv fullness, just before removal of the bits of a first picture following the entry point equals or exceeds the associated threshold fullness, the portions of the first compressed digital bit stream following the entry point may be decoded without causing the vbv to underflow. Using an encoder, the second compressed digital video bit stream is generated. The second compressed digital video bit stream results in an ending fullness of a vbv one picture time after removal of the bits corresponding to a last picture of the second compressed digital video bit stream. This ending fullness equals or exceeds the threshold fullness associated with one of the entry points. The first and second compressed digital video bit streams are then spliced so that the last picture of the second compressed digital bit stream is immediately followed said one of the entry points in the first compressed digital video bit stream.

A third embodiment of the invention provides a method and system for determining and recording a minimal ending vbv fullness at each of a plurality of entry points in a compressed variable bit rate video bit stream.

DETAILED DESCRIPTION OF THE INVENTION

In a first embodiment of the present invention, an ending buffer fullness is determined based on look-ahead statistics. In brief, a digital video bit stream is encoded and simultaneously statistically analyzed (or analyzed after encoding) and then decoded. An effect (such as a fade or blending of pictures) is added to the decoded bit stream. Based on the statistics gathered during encoding (or from the encoded bit streams itself), the decoded and effected bit stream is re-encoded such that a predetermined buffer fullness is achieved at the end of the bit stream having the added effect.

Figure 1A:
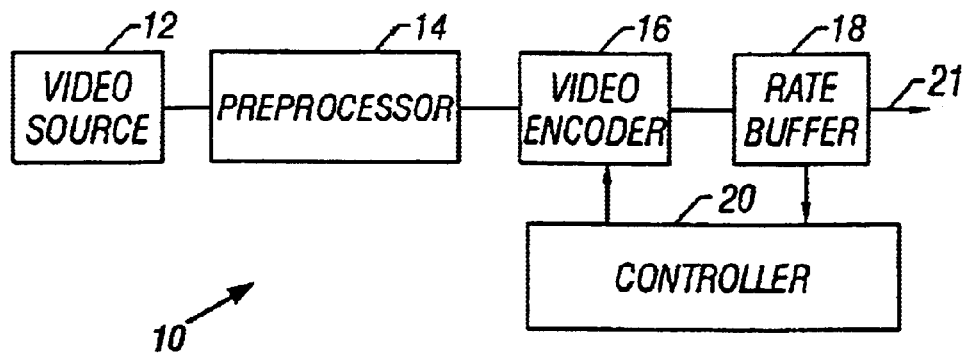
FIG. 1A illustrates an encoder for encoding a video bit stream in accordance with the MPEG-2 standard, for example.
Figure 1B:
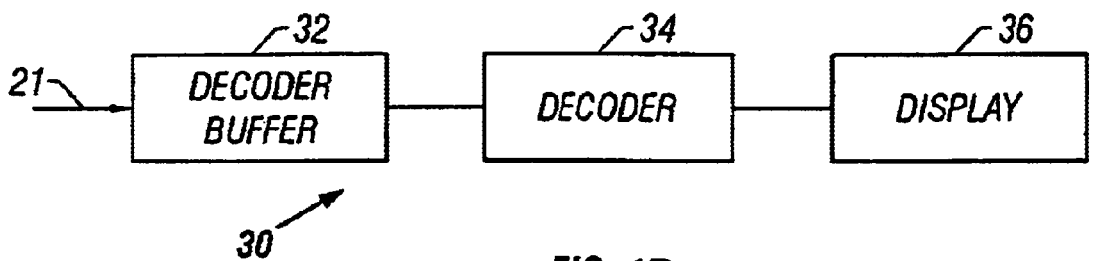
FIG. 1B illustrates a decoder for decoding the bit stream generated by the encoder of FIG. 1A.
Figure 2A:
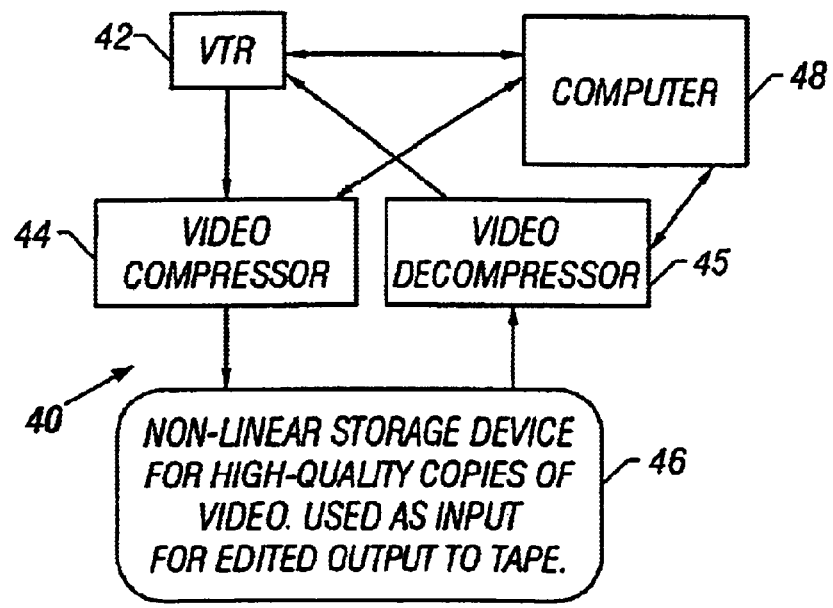
FIG. 2A schematically illustrates a prior art non-linear video editor.
Figure 2B:
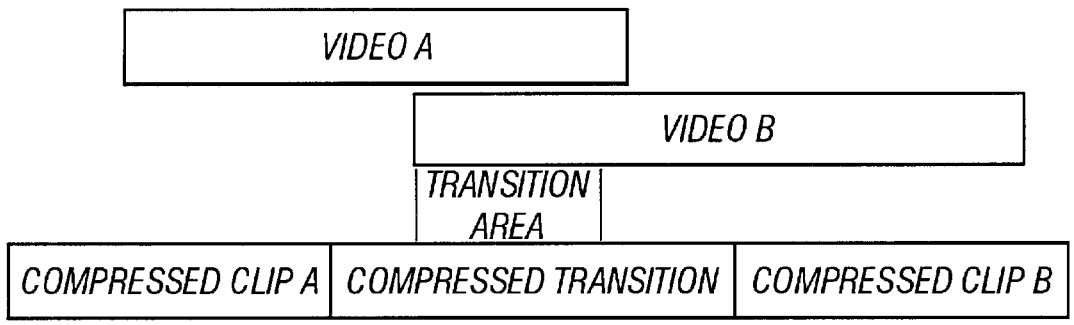
FIG. 2B schematically illustrates the creation of a compressed translation bit stream between two compressed bit streams.
Figure 3:
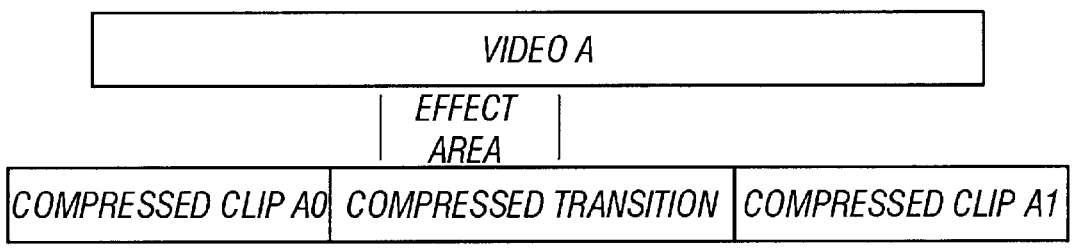
FIG. 3 schematically illustrates a compressed "effect" bit stream in the middle of a compressed video stream.
Figure 4:
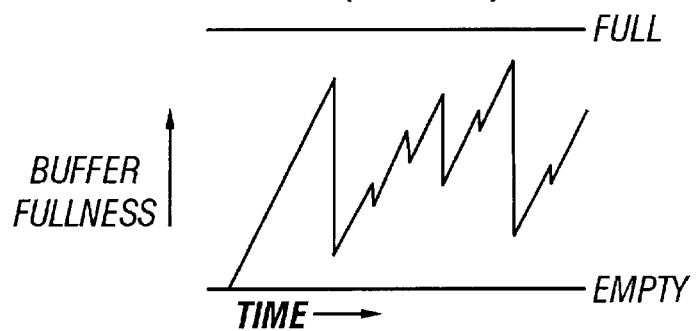
FIG. 4 is a plot of vbv buffer fullness for a constant rate bit stream.
Figure 5:
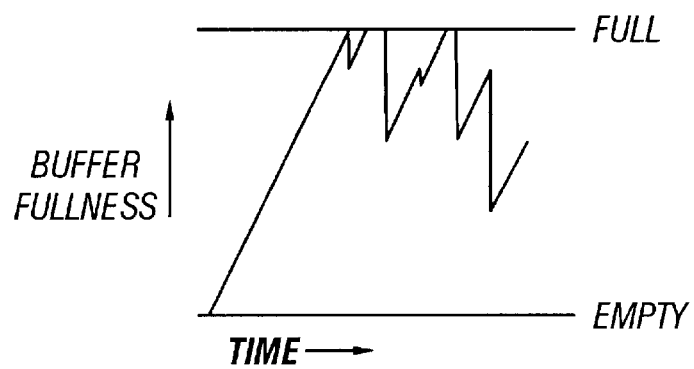
FIG. 5 is a plot of vbv buffer fullness for variable bit rate bit stream.
Figure 6:
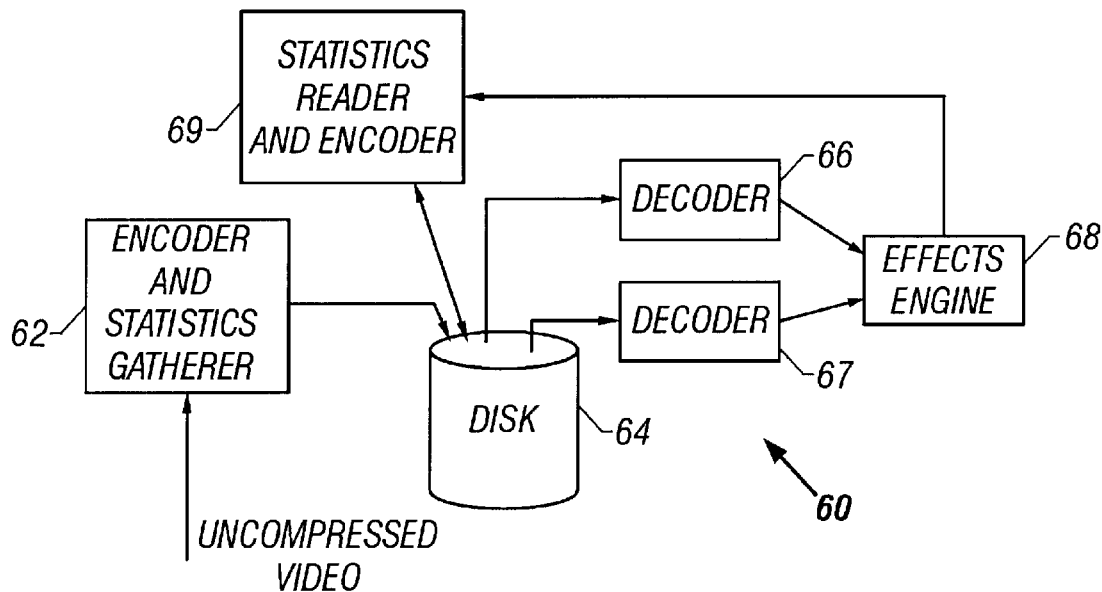
FIG. 6 is a block diagram of a buffer matching editing system using stored encoding statistics in accordance with an illustrative embodiment of the invention.

FIG. 6 shows an illustrative embodiment of a buffer matching editing system 60 using storage of encoding statistics gathered simultaneously with the first encoding. System 60 includes an encoder and statistics gatherer 62, a storage medium such as a disk 64, multiple decoders 66 and 67, an effects engine 68, and a statistics reader and encoder 69. It is desirable to integrate as many components as possible of the inventive system into a single integrated circuit.

In operation, uncompressed (raw) video streams is supplied to encoder and statistics gatherer 62, where each stream is divided into segments, so that a complexity statistic may be computed for each segment. A segment would typically include a macroblock, a row of macroblocks, or a whole picture. A complexity statistic is, e.g., an average base quantization scale (the quantization scale prior to adaptive quantization) times the number of bits used plus a constant.

The encoded and analyzed segmented bit streams are then stored in disk 64. Next, each encoded bit stream (or segment) is alternately decoded in decoders 66 and 67, respectively, so that effects engine 68 can place an effect between two decoded bit streams (or segments), as desired.

Thereafter, the decoded bit streams need to be re-encoded with an ending buffer fullness determined in statistics reader and encoder 69. The ending buffer fullness, which is based on the statistics gathered in gatherer 62, determines the total number of bits that can be used. Bits are allocated in proportion to the complexity of each segment so that the total number allocated is equal to or slightly less than the total available. If the segment being encoded is derived from two or more bit streams, the complexity is a weighted average of the complexity of the component videos.

A conventional rate control algorithm is used in statistics reader and encoder 69 to determined the buffer fullness. Since the statistics were gathered during the first encoding of the raw video streams, the statistical results have an accuracy that allows a fast reacting rate control algorithm to be utilized with sufficient image quality. The bit allocations are preferably recomputed periodically using the rate control algorithm, so that if the number of bits used was higher or lower than expected for the beginning pictures of the video stream, the allocations will be increased or decreased, respectively, for the remaining segments. In addition, the reaction rate of the rate control is preferably increased periodically, so that it is at its highest rate at the end of the video.

Figure 7:
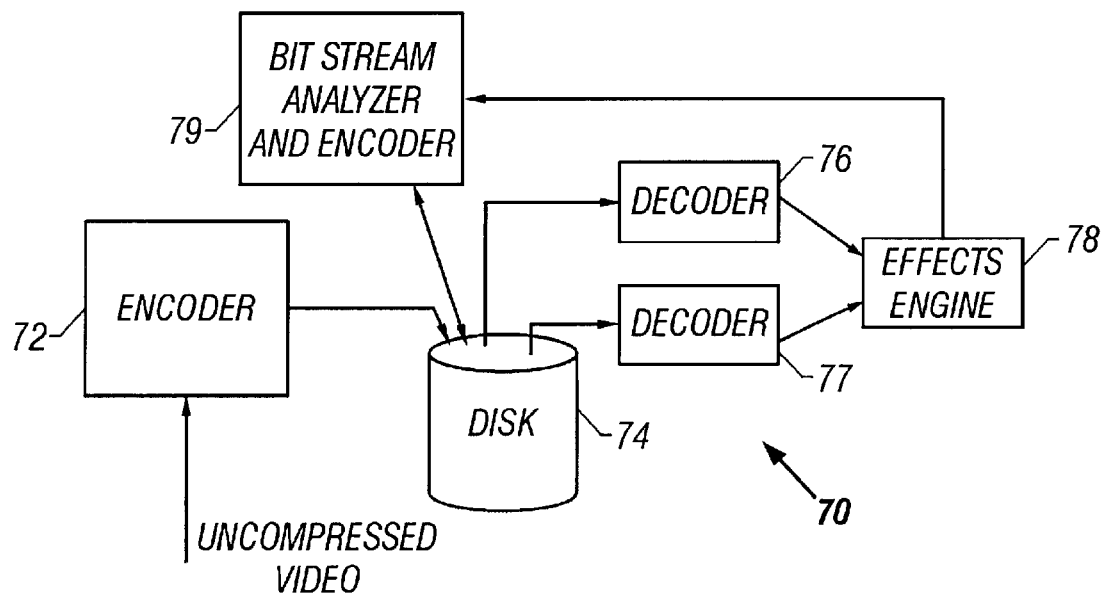
FIG. 7 is a block diagram of a buffer matching editing system using stored encoding statistics in accordance with an alternative illustrative embodiment of the invention.

FIG. 7 shows an alternate embodiment of a buffer matching editing system 70 using storage of encoding statistics drawn from encoded bit streams. It is desirable to incorporate as many components of the system 70 as possible in a single integrated circuit. System 70 includes an encoder 72, a disk 74, multiple decoders 76 and 77, an effects engine 78, and a bit stream analyzer and encoder 79.

The operation of system 70 is similar to that of system 60 except that the statistical analysis is performed after the raw video is encoded (as well as decoded and effected). However, these statistics will typically be less accurate as the statistics derived in system of FIG. 6. For example, the quantization scale used to compress a macroblock cannot always be determined from the bit stream. However, the system of FIG. 6 may not always be practical. For example, a non-linear editor that receives a compressed bit stream rather than raw video may not be operable in system 60.

Figure 8:
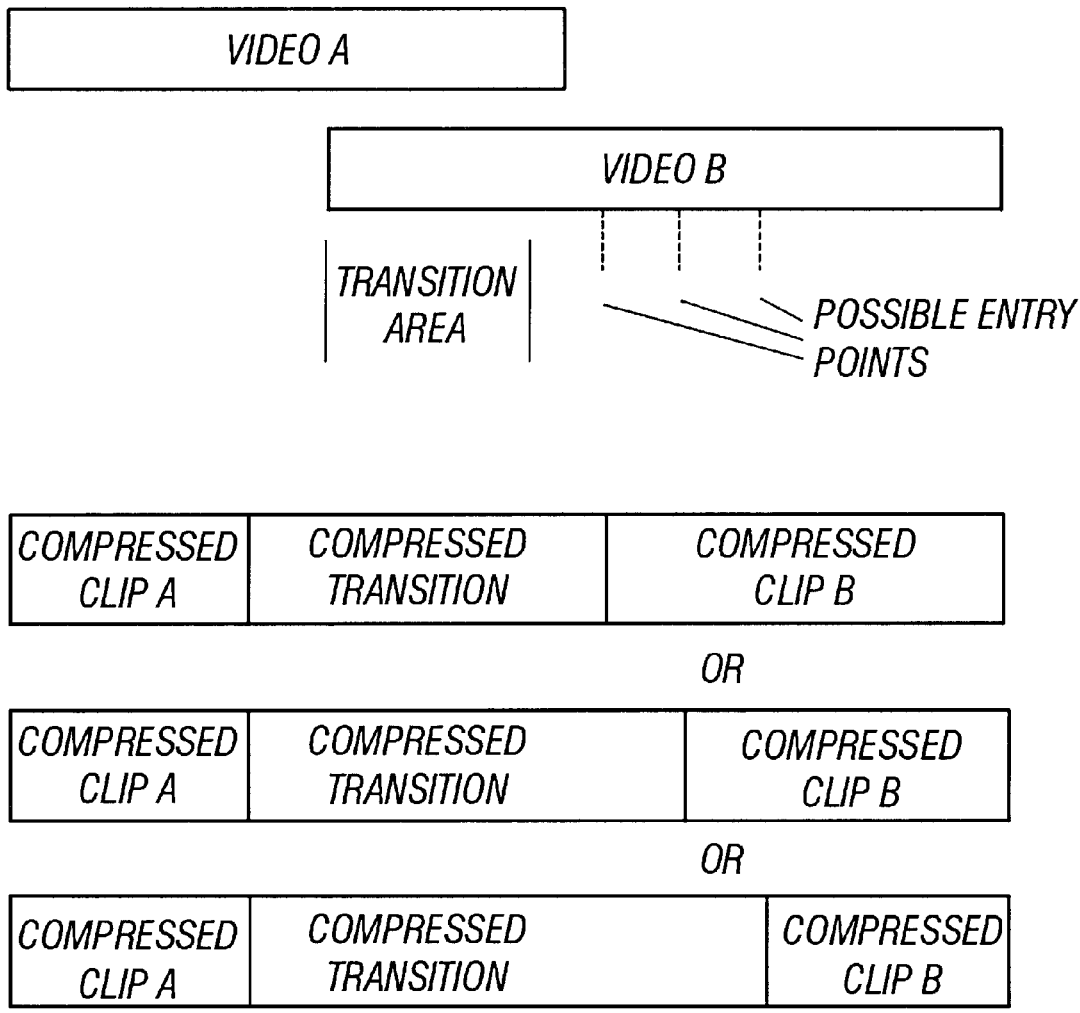
FIG. 8 illustrates an ending buffer fullness splicing method with variable splice points according to an illustrative embodiment of the invention.

In a second embodiment of the present invention, the ending buffer fullness (determined, e.g., in reader/analyzer 69 or 79) is based on variable splice points. FIG. 8 illustrates a video stream A to be spliced with a video stream B over a transition area (where the effects are added). The encoder identifies several possible entry points into video stream, B. The encoder then determines whether the ending buffer fullness at the first entry point is too low. If it is, in fact, too low, then the ending buffer fullness is determined for the next entry point. For each entry point attempted, the rate control reaction time is increased.

This process is repeated, if necessary, until the last possible entry point. At this point, the reaction rate is set high enough to guarantee that the ending buffer fullness will be sufficient, i.e. that too many bits are not used. Note that the lower the reaction rate of the rate control, the higher the image quality. Accordingly, since the reaction rate is initially set relatively low, the image quality is improved over a fast rate control. Such method of determining the sufficiency of the buffer fullness is described in the application entitled, "Rate Control With Panic Mode," Ser. No. 08/578,229 filed on Dec. 26, 1995 by K. Metin Uz et al. Such application is assigned to the assignee of this invention and is fully incorporated herein by reference.

Figure 9:
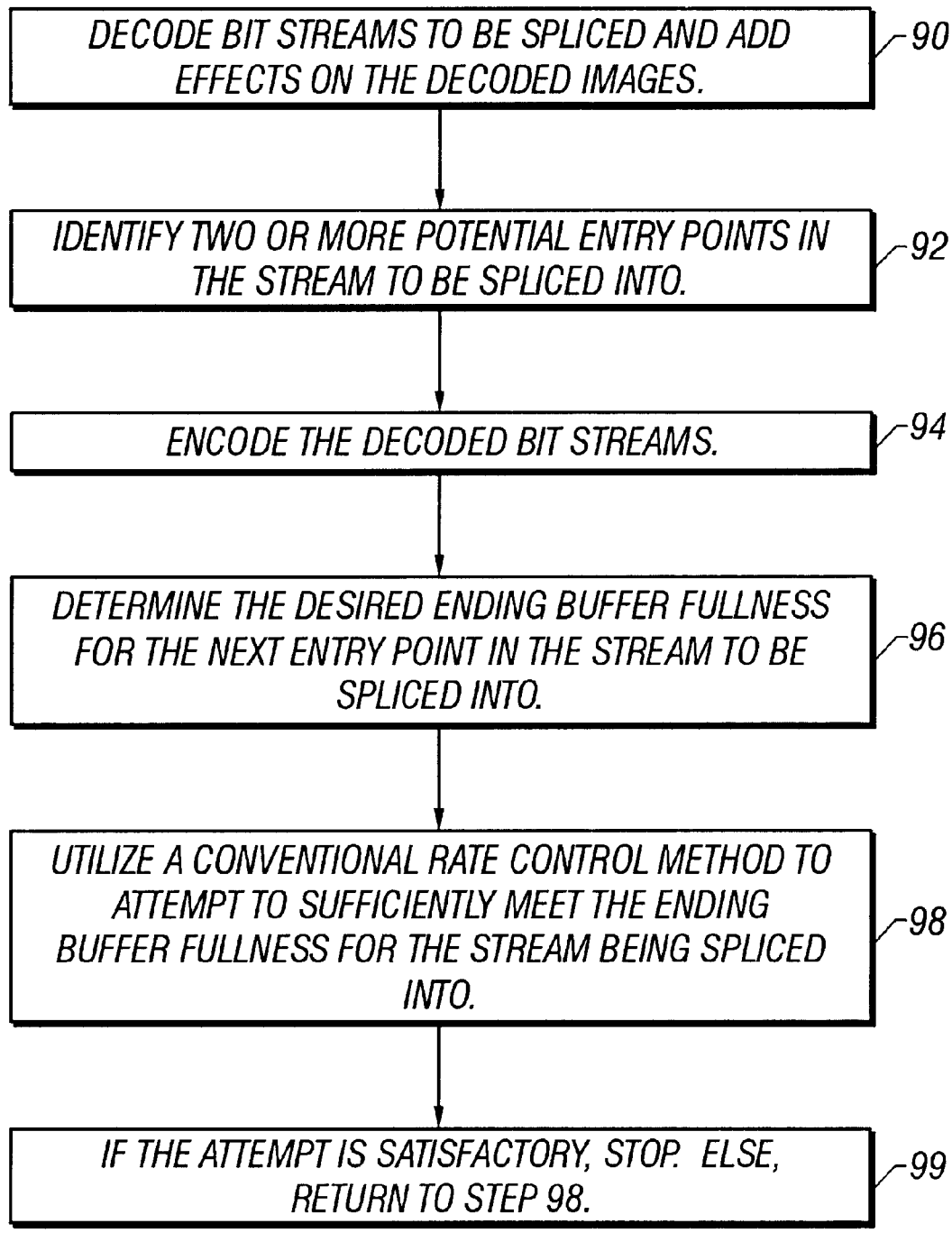
FIG. 9 is a flow chart for the variable splice point method according to an illustrative embodiment of the invention.

FIG. 9 is a flow chart describing the above variable splice point method. The method is carried out by the systems illustrated in FIG. 6 and FIG. 7. In step 90, the bit streams to be spliced, (illustratively video streams A and B) are decoded and effects on the decoded images are added. In step 92, two or more potential entry points in stream B are identified. Next, the decoded bit streams A and B are encoded in step 94. In step 96, the desired ending buffer fullness for the next entry point in stream B is determined. In step 98, a conventional rate control method is used to attempt to sufficiently meet the ending buffer fullness for stream B.actory, the process ends. If not, the process returns to step 98.

A third embodiment of the present invention describes a variable bit rate minimum decoder buffer fullness tracking system. As previously mentioned, when video streams are encoded using conventional variable bit rate techniques, no record is kept of the minimum decoder buffer fullness needed to decode the remainder of the bit stream without decoder buffer underflows. This can cause problems when splicing into such a stream.

Figure 10:
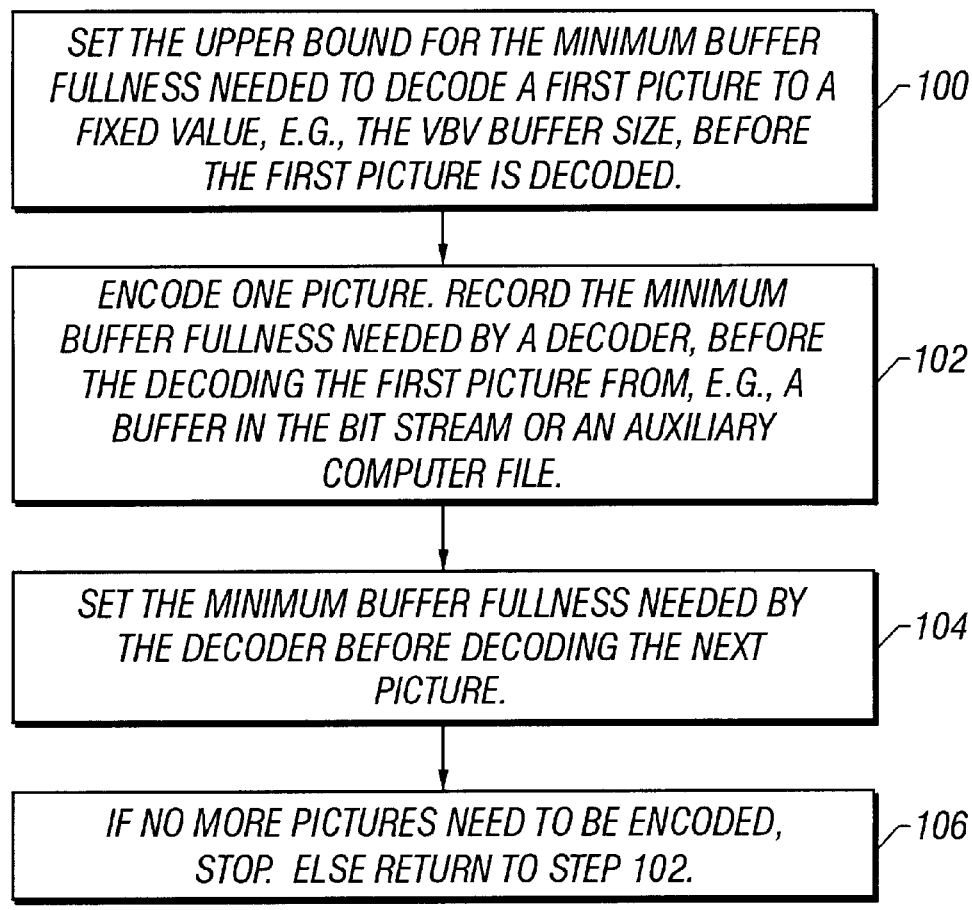
FIG. 10 is a flow chart describing a method for tracking the minimum decoder buffer fullness needed before decoding each picture in a variable bit rate stream, in accordance with an illustrative embodiment of the invention.

FIG. 10 is a flow chart describing a method for tracking the minimum decoder buffer fullness (the upper bound of bits) needed before decoding each picture in a sequence of pictures of a variable bit rate stream. In step 100, the upper bound for the minimum buffer fullness needed is set to a fixed value, e.g., the vbv buffer size, prior to removing the first picture from the decoder buffer (or, e.g., an auxiliary computer file). In step 102 the first picture is encoded. Further, the minimum buffer fullness needed by the decoder, before decoding the first picture from the buffer is then determined and recorded in a storage device.

In step 104, the minimum buffer fullness needed by the decoder, before decoding the next picture is determined. Such determination is based on the algorithm:

minimum buffer fullness=the upper bound number of bits–the number of bits in the encoded first picture+(the bit rate×the delay between encoding the first and next encoded pictures).

Figure 11:
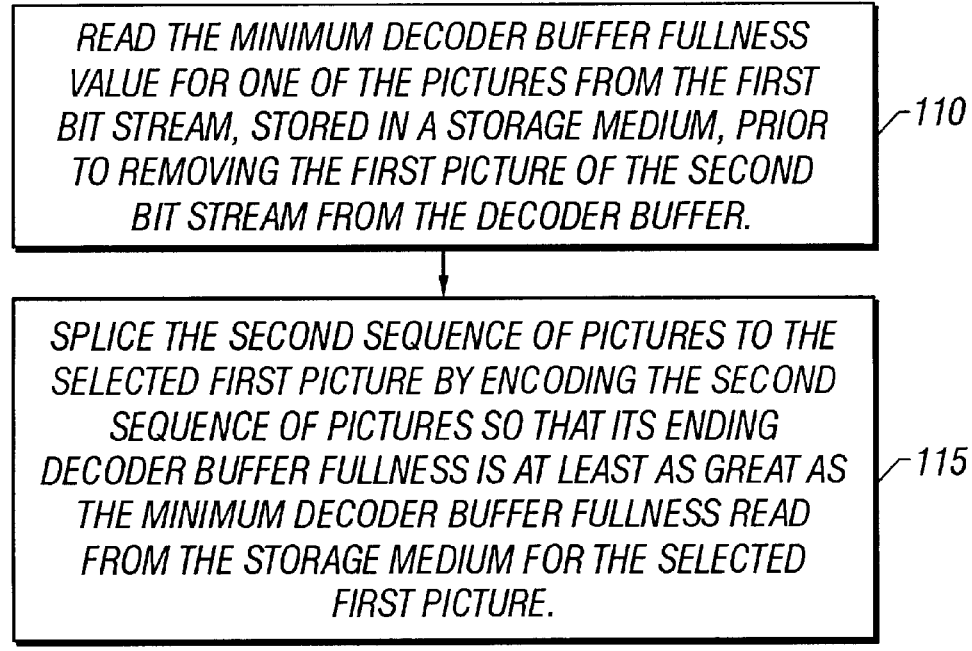
FIG. 11 is a flow chart describing how to splice into a variable bit rate stream for which the minimum decoder buffer fullness needed before removing each picture has been recorded according to an illustrative embodiment of the invention.

FIG. 11 is a flowchart describing how to splice a second video bit stream having a sequence of video pictures in front of (i.e., prior to in a video sequence) a picture from the first bit stream for which the minimum decoder buffer fullness was previously recorded (e.g., from FIG. 10).

In step 110, the minimum decoder buffer fullness value for one of the pictures from the first bit stream, stored in a storage medium, is read prior to removing the first picture of the second bit stream from the decoder buffer. In step 115, the second sequence of pictures is spliced in front of the selected first picture by encoding the second sequence of pictures so that its ending decoder buffer fullness is at least as great as the minimum decoder buffer fullness read from the storage medium for the selected first picture.

Finally, the above-discussion is intended to be merely illustrative of the invention. Numerous alternative embodiments may be devised by those having ordinary skill in the art without departing from the spirit and scope of the following claims.

I claim:

1. A method for encoding a sequence of video pictures to generate an encoded digital video bit stream comprising the steps of:

(a) encoding each picture in said sequence to generate a portion of said digital video bit stream, (b) for each picture in said sequence, determining a minimum decoder buffer fullness needed by a decoder before removing said portion of said digital video bit stream corresponding to the picture from a decoder buffer so as to avoid said decoder buffer underflowing, and (c) storing in a storage medium each of said minimum decoder buffer fullness determined in step (b).

2. The method of claim 1 further comprising the steps of:

reading from said storage medium said minimum decoder buffer fullness determined for one of said pictures, and splicing a second sequence of video pictures to said one picture in said sequence of video pictures by encoding said second sequence of video pictures so that its ending decoder buffer fullness is at least as great as the minimum decoder buffer fullness read from said storage medium for said one picture.

3. An encoding system for encoding a sequence of video pictures to generate an encoded digital video bit stream comprising:

(a) an encoder for encoding each picture in said sequence to generate a portion of said digital video bit stream, (b) a processor for determining for each of a plurality of pictures in said sequence a minimum decoder buffer fullness needed by a decoder before removing said portion of said digital video bit stream corresponding to the picture from a decoder buffer so as to avoid said decoder buffer underflowing, and (c) a storage medium for storing each of said minimum decoder buffer fullnesses.

* * * * *